(12) United States Patent
Dabrowski

(10) Patent No.: US 10,335,003 B2
(45) Date of Patent: Jul. 2, 2019

(54) SYSTEM AND METHOD FOR AN AUTONOMOUS CLEANING APPARATUS

(71) Applicant: ADVANCED DIGITAL BROADCAST S.A., Eysins (CH)

(72) Inventor: Bartosz Dabrowski, Zielona Gora (PL)

(73) Assignee: ADVANCED DIGITAL BROADCAST S.A., Eysins (CH)

( * ) Notice: Subject to any disclaimer, the term of this patent is extended or adjusted under 35 U.S.C. 154(b) by 203 days.

(21) Appl. No.: 15/464,371

(22) Filed: Mar. 21, 2017

(65) Prior Publication Data

US 2017/0273530 A1    Sep. 28, 2017

(30) Foreign Application Priority Data

Mar. 23, 2016   (EP) .................... 16161810

(51) Int. Cl.
*A47L 9/28* (2006.01)
*G05D 1/00* (2006.01)
*A47L 11/40* (2006.01)
*G05D 1/02* (2006.01)
*A47L 9/00* (2006.01)

(52) U.S. Cl.
CPC ........... *A47L 9/2852* (2013.01); *A47L 9/009* (2013.01); *A47L 9/2805* (2013.01); *A47L 9/2857* (2013.01); *A47L 9/2894* (2013.01); *A47L 11/4011* (2013.01); *G05D 1/0088* (2013.01); *G05D 1/0219* (2013.01); *G05D 1/0234* (2013.01); *G05D 1/0259* (2013.01); *G05D 1/0261* (2013.01); *A47L 2201/04* (2013.01); *G05D 2201/0215* (2013.01)

(58) Field of Classification Search
CPC ...... A47L 9/2852; A47L 9/2857; A47L 9/009; A47L 9/2805; A47L 9/2894; A47L 11/4011; A47L 2201/04; G05D 1/0234; G05D 1/0088; G05D 1/0261; G05D 1/0259; G05D 1/0219; G05D 2201/0215
See application file for complete search history.

(56) References Cited

U.S. PATENT DOCUMENTS 6,809,490 B2   10/2004   Jones et al.
7,167,775 B2    1/2007   Abramson et al.
8,855,914 B1   10/2014   Alexander et al.
(Continued)

FOREIGN PATENT DOCUMENTS

DE   102011050357 A1   2/2012

OTHER PUBLICATIONS

S. Meyer Zu Borgsen, M. Schöpfer, L. Ziegler and S. Wachsmuth, "Automated Door Detection with a 3D-Sensor," 2014 Canadian Conference on Computer and Robot Vision, Montreal, QC, 2014, pp. 276-282 (Year: 2014).*

*Primary Examiner* — Adam R Mott
(74) *Attorney, Agent, or Firm* — Mark M. Friedman

(57) ABSTRACT

Method for an autonomous cleaning apparatus, the method comprising the steps of: scanning a vicinity of an autonomous cleaning apparatus by means of at least one sensor; detecting an unreachable area, being unreachable by the autonomous cleaning apparatus; detecting a door in proximity to the unreachable area; detecting that the unreachable area is unreachable due to the positioning of the door wing; automatically moving the door wing, by the autonomous cleaning apparatus, in order to obtain access to and clean the unreachable area.

13 Claims, 11 Drawing Sheets

(56) References Cited

U.S. PATENT DOCUMENTS

2013/0206177 A1   8/2013  Burlutskiy
2015/0205297 A1* 7/2015  Stevens .................... G01S 1/68
                                                        701/2
2018/0292827 A1* 10/2018 Artes ..................... B25J 9/1664

* cited by examiner

SYSTEM AND METHOD FOR AN AUTONOMOUS CLEANING APPARATUS

TECHNICAL FIELD

The present invention relates to a system and method for an autonomous cleaning apparatus. In particular, the invention relates mainly to devices moving through surfaces e.g. autonomous vacuum cleaners or mops. Such devices are required to move through available surface in order to reach as much area as possible. The present invention is not limited to such devices as it may apply to any devices required to cover a certain surface area.

BACKGROUND OF THE INVENTION

Existing solutions include autonomous systems for corner detection like the publication U.S. Pat. No. 8,855,914 B1 However the publication itself lists corners of angles smaller then 90 deg as left worse cleaned then those that are exactly or almost exactly 90 deg. Since the typical scenario where corners angled less the 90 deg are met is open doors, the present invention attempts to allow the surface treatment apparatus to reach a less then 90 deg corner more efficiently.

Other solutions in this technical field include U.S. Pat. No. 6,809,490 B2 entitled "Method and system for multimode coverage for an autonomous robot", which discloses a control system for a mobile robot (10) for effectively covering a given area by operating in a plurality of modes, including an obstacle following mode (51) and a random bounce mode (49). In other embodiments, spot coverage, such as spiralling (45), or other modes are also used to increase effectiveness. In addition, a behaviour based architecture is used to implement the control system, and various escape behaviours are used to ensure full coverage.

SUMMARY AND OBJECTS OF THE PRESENT INVENTION

An object of the present invention is a method for an autonomous cleaning apparatus, the method comprising the steps of scanning a vicinity of an autonomous cleaning apparatus by means of at least one sensor; detecting an unreachable area, being unreachable by the autonomous cleaning apparatus; detecting a door in proximity to the unreachable area; detecting that the unreachable area is unreachable due to the positioning of the door wing; automatically moving the door wing, by the autonomous cleaning apparatus, in order to obtain access to and clean the unreachable area.

Preferably, the unreachable area is a corner of 90 or less degrees measure.

Preferably, the step of detecting a door in proximity to the unreachable area comprises measuring a length of either side of the door wing.

Preferably, the method further comprises determining thickness of the detected object.

Preferably, the method further comprises determining presence of a door gap under the detected object.

Preferably, the step of automatically moving the door wing is effected by a door wing position changing means.

Preferably, the door wing position changing means allow to push or pull the door wing.

Preferably, the door wing position changing means is an electromagnet or a suction element or a neodymium magnet or a retractable hook.

Preferably, the step of detecting a door in proximity to the unreachable area comprises detecting, with a sensor, a tag attached to the door.

Preferably, the tag is an RFID tag or an optical tag or a magnetic tag.

Preferably, the tag has an enabled state and a disabled state wherein the enabled state allows the tag to be detected by the sensor and the disabled state disallows the tag from being detected by the sensor.

Preferably, the method further comprises the steps of remembering the initial positioning of the door, moving the door as required to achieve best cleaning of the surface and lastly bringing back the door to the initial position.

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

BRIEF DESCRIPTION OF THE DRAWINGS

These and other objects of the invention presented herein are accomplished by providing a system and method for an autonomous cleaning apparatus. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

As utilized herein, the term "door" means a movable, usually solid, barrier for opening and closing an entranceway, cupboard, cabinet, or the like, commonly turning on hinges or sliding in grooves.

DESCRIPTION OF EMBODIMENTS

The invention comprises a method of classification of an obstacle as door, and a method of handling the door in order to eliminate, for example a less then 90 deg angle.

The following description presents a preferred embodiment of the present invention focusing on a robotic vacuum cleaner as a type of surface treatment device. The use of a robotic vacuum is exemplary only and is in no way limiting to the present invention.

Figure 10:
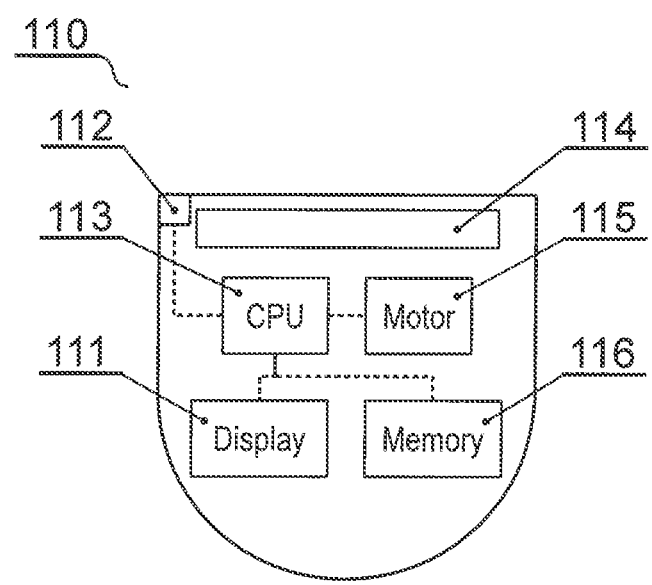
FIG. 10 shows an exemplary embodiment of an autonomous robotic surface coverage device.

An exemplary embodiment of a robotic surface treatment device is depicted in FIG. 10. An exemplary vacuum cleaner is presented. The vacuum cleaner (110) is preferably equipped with a central processing unit performing and coordinating all actions resulting from the present invention. Preferably, a memory (116) is included that may store any operational data or instructions.

The device (110) preferably also comprises a display (111) for interaction with its user. The CPU is able to interact with a plurality of sensors (depicted as (112)), wherein the plurality of sensors comprises distance sensors and/or touch sensors or the like. The device (110) also preferably comprises other elements that may be used to treat the surface, on which the device works.

An exemplary element is depicted as a brush (114). The brush is preferably placed near the front side of the device, which is a known solution in the current state of the art. The device (110) also contains one or more motors (115) and wheels or other means of movement that allow the device (110) to move in a particular direction.

Figure 1:
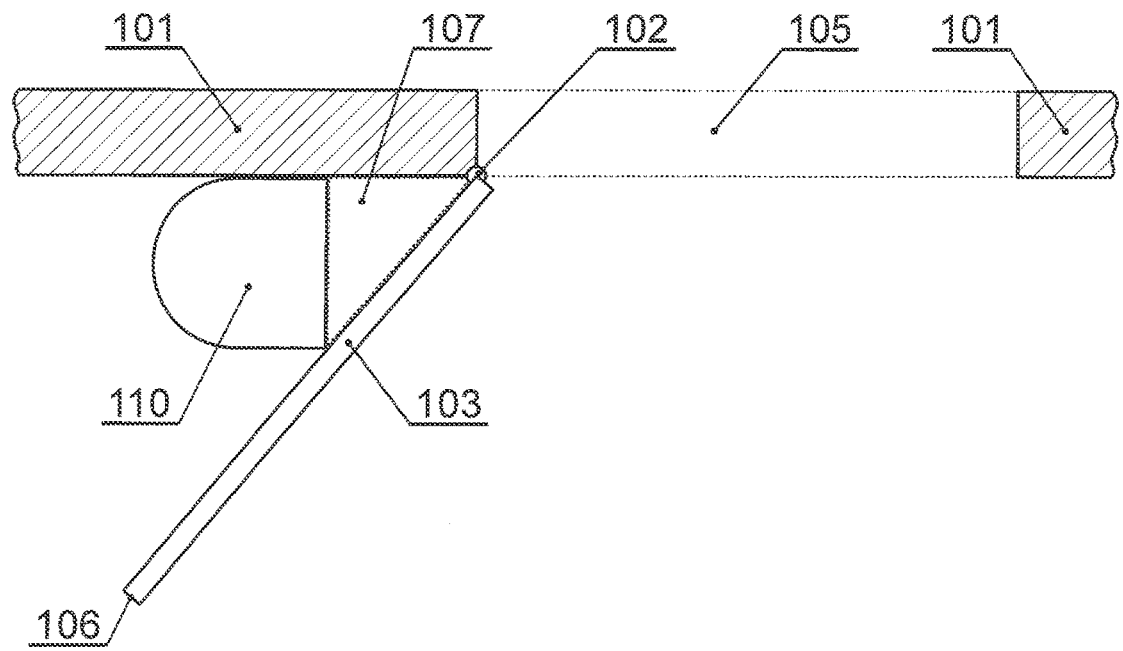
FIG. 1 shows the situation according to the embodiments of the present invention which the present invention handles.

Beginning with FIG. 1, a preferred situation where the present invention may be applied is depicted. The robot (110) approaches an object (preferably a door) (103) while proceeding along a wall (101).

The door (103) is attached to a wall (101) with one or more hinges (102) and can rotate about an axis of that one or more hinges. The door (103) can close to seal or partially seal the opening gap (105). The gap (105) can be a passageway, a door-way, a wardrobe or the like. It is apparent, in the depicted situation, that the robot is not able to reach area (107) due to its size.

Figure 2:
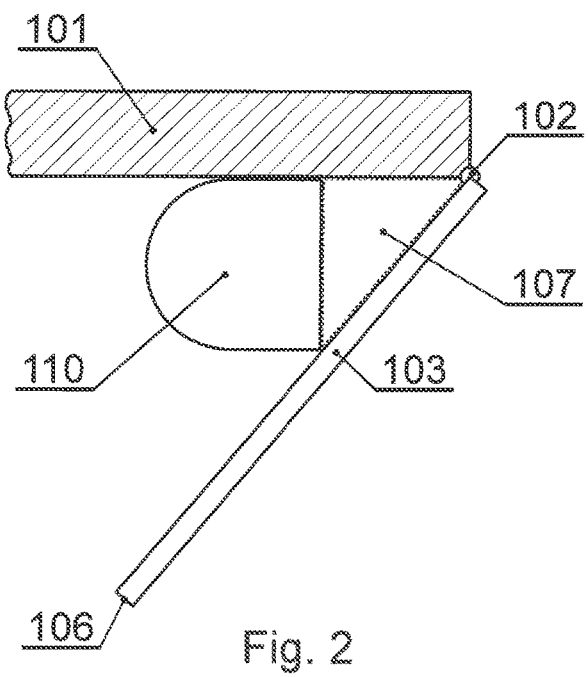
FIG. 2 depicts a robotic device at a detected corner of less than 90 degrees.
Figure 7A:
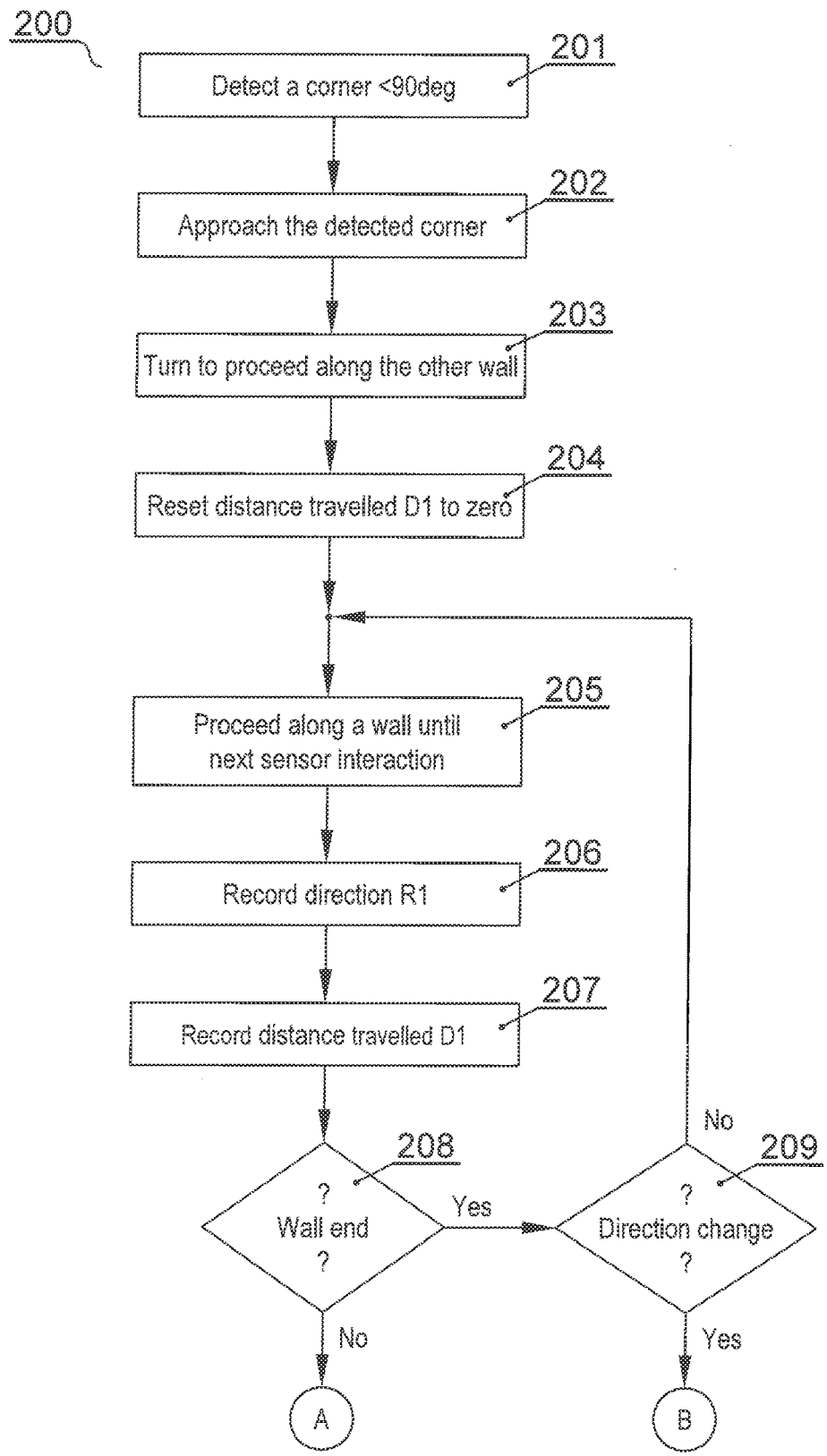
FIG. 7A and FIG. 7B present the method of classification an obstacle as a door.
Figure 7B:
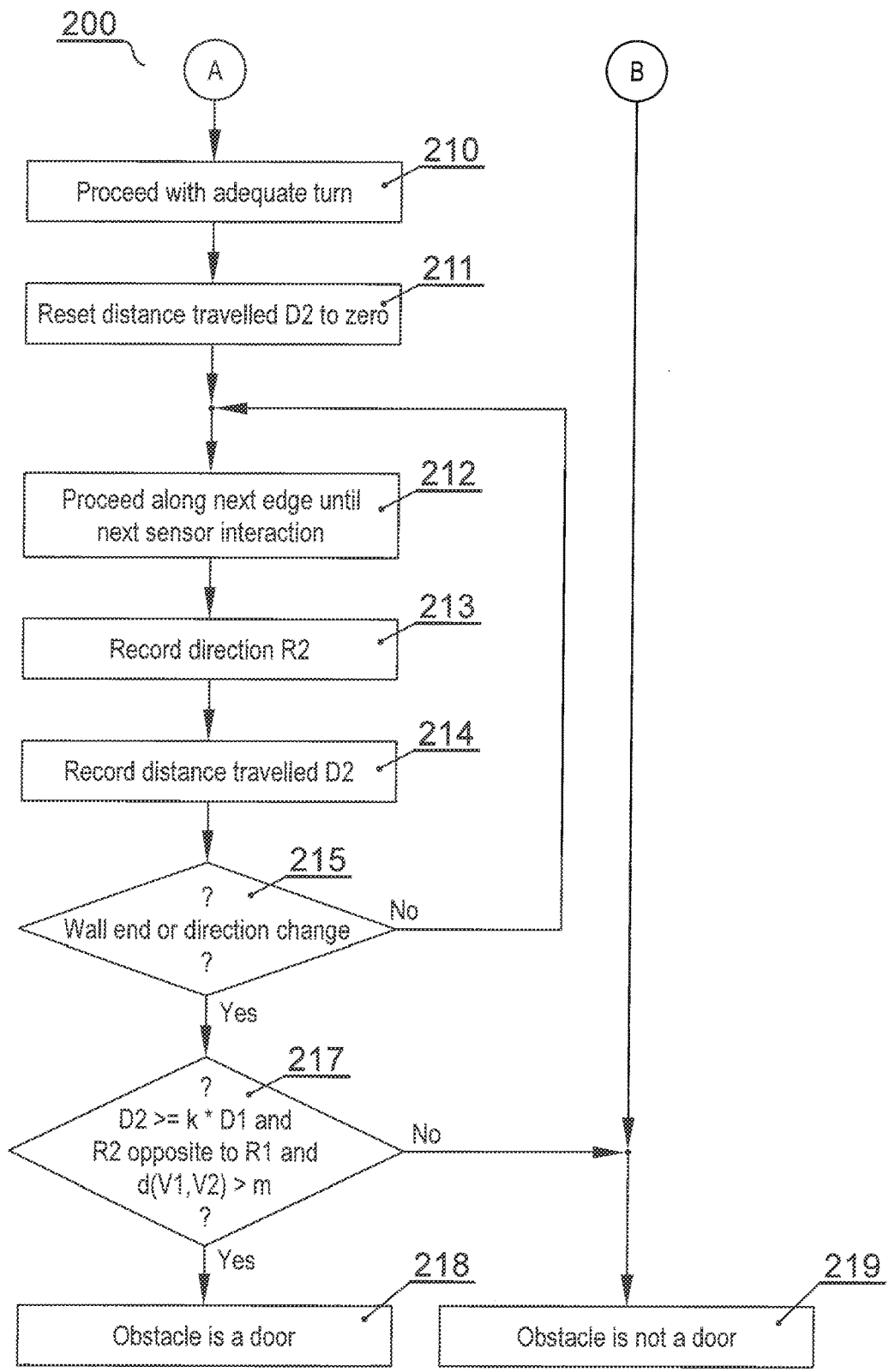

The method (200) according to the present embodiment of the present invention is further depicted in FIG. 7A and FIG. 7B. The method starts at step (201) with a detection of a corner of 90 or less degrees measure. This situation is depicted in FIG. 2. It is to be noted that neither the method of detection of corners nor the method of determining the measure of a corner are within the scope of the present invention. The behaviour of the robot resulting from such detection is.

The robot approaches the detected corner at step (202) and proceeds with an adequate turn at step (203). It is apparent to a one skilled in the art that the turn may be performed according to any known or implemented methods without departing from the idea of the present invention.

Figure 3:
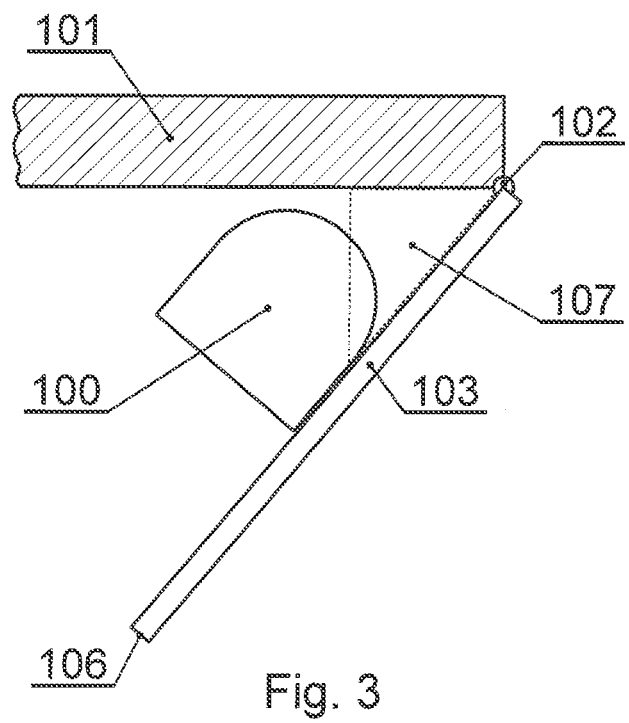
FIG. 3 shows the said robot after turning at the aforementioned angle and proceeding along the first wall.

At this point the robot resets a value of D1 to zero (204) wherein D1 denotes a distance travelled by the robot. At step (205) the robot proceeds along the wall after turning. This situation is depicted in FIG. 3.

The direction R1 of this movement is measured at step (206) and distance D1 at step (207). At step (208) a sensor interaction takes place and it is decided whether the interaction is an end of a wall. If not, then at step (209), it is decided whether the interaction changes the direction of movement of the robot.

It is apparent to a one skilled in the art that this may be due to involvement of many sensors in the interaction at step (208). Hence, the behaviour resulting from such may comprise change in direction. This is decided at step (209). If the direction is not changed, the robot proceeds along the wall at step (205). However, if the direction changes, then the obstacle (103) is not considered a door and the method ends at step (219).

If the wall ends at step (208), then the robot proceeds with an adequate turn at step (210). The turn may be realized according to publication U.S. Pat. No. 8,855,914 B1 (p 5, line 54). However the method of realizing the turn is not in the scope of the present invention and is not limiting in any way.

Figure 4:
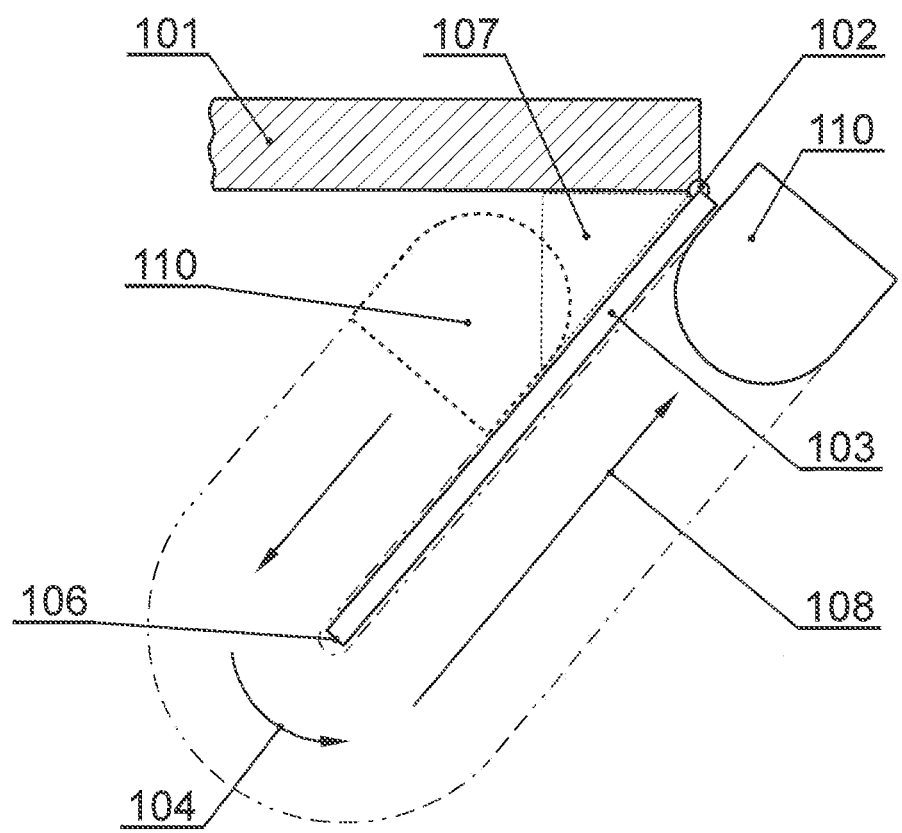
FIG. 4 depicts the path travelled by the robotic device according to the described embodiments of the present invention.

The area where the turn takes place is shown in FIG. 4, item (104). Next, the distance value D1 is reset to zero at step (211) and the robot proceeds along the new wall at step (212). This area is depicted in FIG. 4, item (108). The direction of the movement is recorded at step (213) and the distance D2 at step (214). At step (215) a sensor interaction takes place and it is decided whether the interaction is an end of wall or the interaction changes the direction of movement of the robot. It is apparent to a one skilled in the art that this may be due to involvement of many sensors in the interaction at step (215). Hence, the behavior resulting from such may comprise change in direction. If the direction is not changed and a wall end was not detected, the robot proceeds along the wall at step (212).

If the wall ends at step (215) or the direction changes at step (215), then the robot determines the parameters of the travelled path. The path is depicted in FIG. 4. It is decided whether the distance D2 travelled along the second wall is large enough in comparison to the distance D1. An exemplary comparison checks whether D2 is larger than a predefined fraction of D1.

Preferably the distance between vectors V1 and V2 is also measured in order to determine object thickness. The vector V1 begins at the point of start of D1 measurement at step (204) and ends at the last point of measuring of D1 at step (207). The vector V2 begins at the point of start of V2 measurement at step (211) and ends at the last point of measuring of D2 at step (214). Preferably, it is checked whether the distance between vector V1 and V2 is small enough (taking into account the outer dimensions of the robot) to determine that object (103) is a door. An exemplary embodiment of such check would comprise a comparison of the distance between V1 and V2 to a predefined value m of 10 cm.

In another embodiment, a further door gap sensor may be added to the device (110) such that the sensor may detect presence of a door gap under the detected object, preliminarily identified as door.

At step (217) it is also checked whether the measured direction R2 is opposite or substantially opposite to R1. It is apparent to a one skilled in the art that the same purpose of measuring the travelling path may be achieved by measuring different parameters adequately to the capabilities of the robotic device which is not limiting to the present invention in any way.

Figure 8:
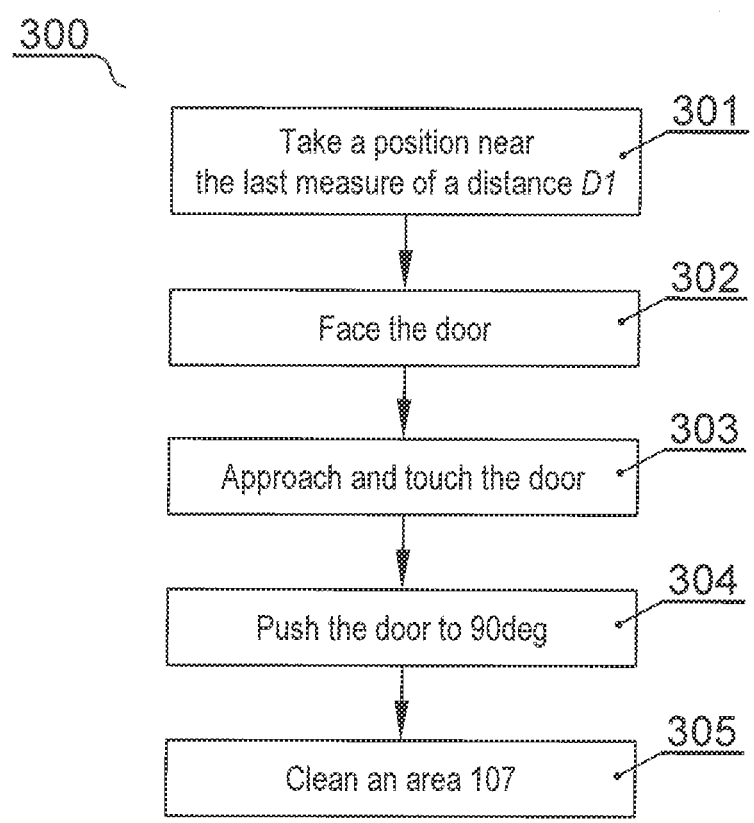
FIG. 8 presents the method of pushing the door to a 90 degree angle.

If the comparison at step (217) is positive, the obstacle (103) is considered a door (218) and the robot may choose to handle the obstacle (103) preferably according to method (300) in FIG. 8. However, if the comparison is negative, the obstacle (103) is not considered a door, the method ends at step (219).

The method of FIG. 8 (300) begins at step (301), where the robot takes a position near the last measurement of distance D1. It is apparent to a one skilled in the art that the determination of this location may be done differently and the method described here is merely a preferred embodiment. The purpose is to position the device (110) adequately towards the ending (106) of the door (103) (the ending being positioned furthest from the hinges). The exact placement may be dependent on the physical characteristics and capabilities of the robot and/or on external conditions or the like.

The method of reaching the location near the aforementioned end (106) of the door (103) is also not in the scope of the present invention. It may be retracing of the path of the robot or an algorithm based on starting and ending location only or remembering past interactions with sensors to optimize the path or the like. At step (302), the robot preferably faces the door i.e. it positions itself so as to be able to move directly towards it.

Figure 5:
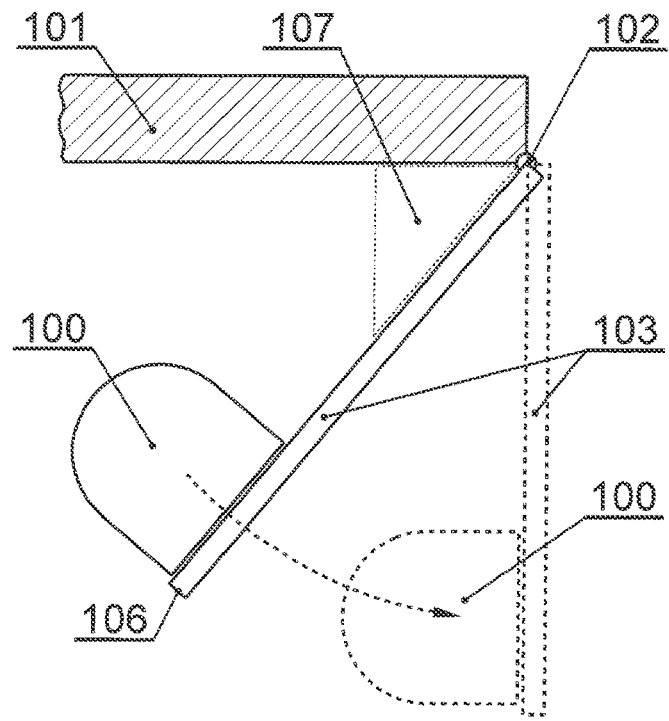
FIG. 5 depicts the robotic device positioned to push the door.
Figure 6:
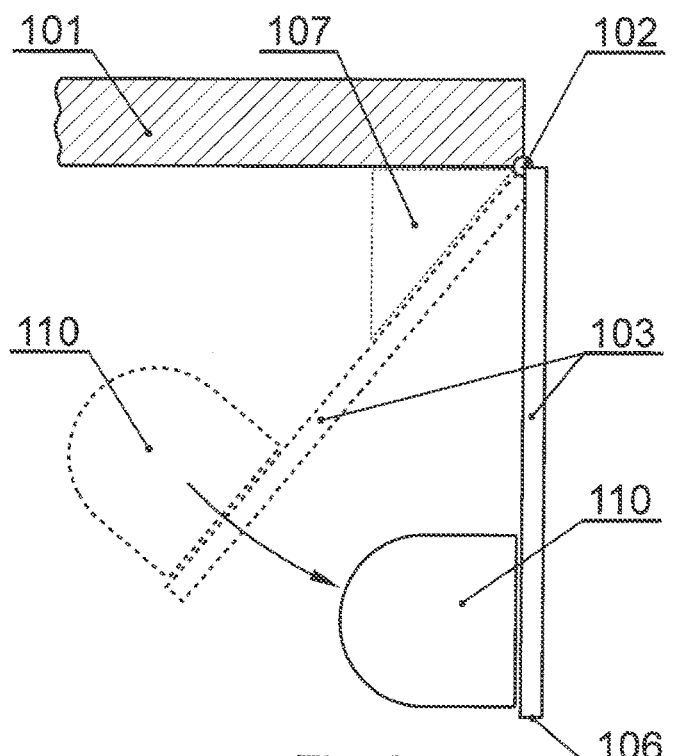
FIG. 6 depicts the robotic device having pushed the door to a 90 degree angle.

At step (303) the robot approaches and touches the door in order to push it at step (304). Thus it may be defined, that the robot (110) comprises a door wing position changing means, being in that case its motor and wheels allowing it to push the door wing. The robot according to step (303) is depicted in FIG. 5, while the robot according to step (304) is depicted in FIG. 6.

The push is done so as to position the door, preferably at a 90 degrees angle towards the wall (101). It is apparent to a one skilled in the art that the parameters of the push may vary and will most likely be subject to either physical characteristics or capabilities of the robot or to actual conditions or the like. For example, the robot may push the door with a minimal force so as to be able to detect resistance and stop the method (300) in order to avoid damage to itself or the door.

It is also preferred that the robot is configured to push the door as slowly as possible so as to allow the door to stop at 90 degree angle rather than keep moving after the robot stops pushing.

In other embodiment, the robot may first remember the initial positioning of the door, then move the door as required to achieve best cleaning of the surface and lastly bring back the door to the initial position.

The distance the robot needs to travel, in order to push the door (103) to a 90 degree angle towards the wall (101), can be computed or determined during the time of the push. An exemplary embodiment of the push would determine to push the door for a distance computed based on the measured angle of the corner detected at step (201).

Finally the robot may proceed to cleaning the area (107). This may be implemented according to publication U.S. Pat. No. 8,855,914 B1 already mentioned earlier.

The change of proceeding of the robot (110), along its path to handling the door (103) according to method (300), may be implemented according to publication U.S. Pat. No. 6,809,490 B2 (paragraph at p 8, line 48). However, this is not limiting to the present invention in any way.

It also apparent, to one skilled in the art, that the terms 90 degree and less than 90 degree when applied to angles or measures of angles are exemplary only and can be modified to match either the physical capabilities of the robot or external conditions or the like. For example, the measures may be modified when applied to an embodiment according to FIG. 9.

Figure 9:
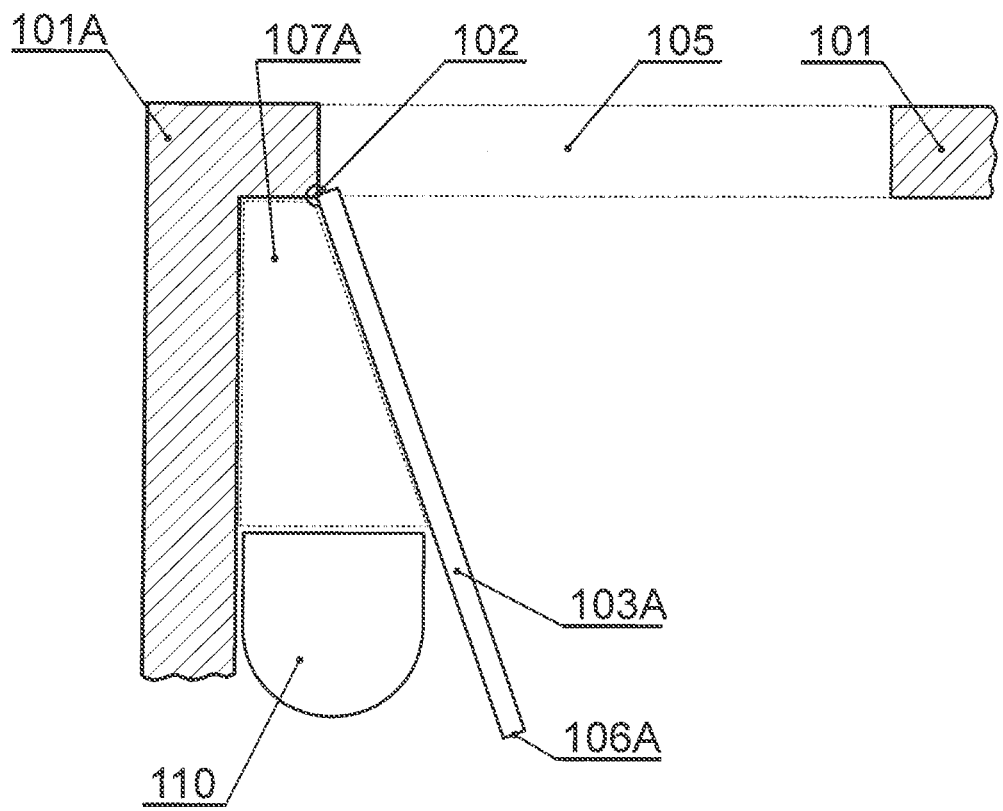
FIG. 9 shows another exemplary situation according to the embodiments of the present invention which the present invention handles.

FIG. 9 shows an exemplary preferred embodiment of the present invention where the 90 degree angle and less than 90 degree angle may be modified to match external conditions. The device (110), detects a corner near a wall (101A) and a door (103A). Alternatively to detecting a corner, the device (110) may detect an unreachable area, which is typically unreachable due to external size of the device (110).

The unreachable area is marked (107A) in FIG. 9. All elements are analogous to their counterparts in FIG. 1. However, a one skilled in the art will notice that some of the parameters of the previously described embodiments may be modified in order to make the present invention more useful, e.g. the term 90 degree angle can be changed or otherwise it may come to a situation that the device (110) closes the door (103A) and cannot cross the area (105).

An exemplary embodiment of this change would comprise checking for the closest object after making the turn at area (104) (FIG. 4) and adjust the actual angle, at which to stop the door (according to step (304) of method (300) in FIG. 8) so that the device (110) can fit between the door (103A) and the detected object. Typically, this object will turn out to be a wall (101). Also the parameter 'k' of step (217) of method (200) (FIG. 7B) may be modified in such situation. An exemplary embodiment would comprise making the parameter 'k' linearly proportional the measure of the angle of the detected corner.

In another embodiment of the present invention, the device (110) may be able to record its path permanently or at selected periods and/or record the manoeuvres made like turning, pivoting or going straight or the like. Using this information, it is possible to detect that the device (110) is in a situation of an unreachable area presented in FIG. 11 (107D).

Figure 11:
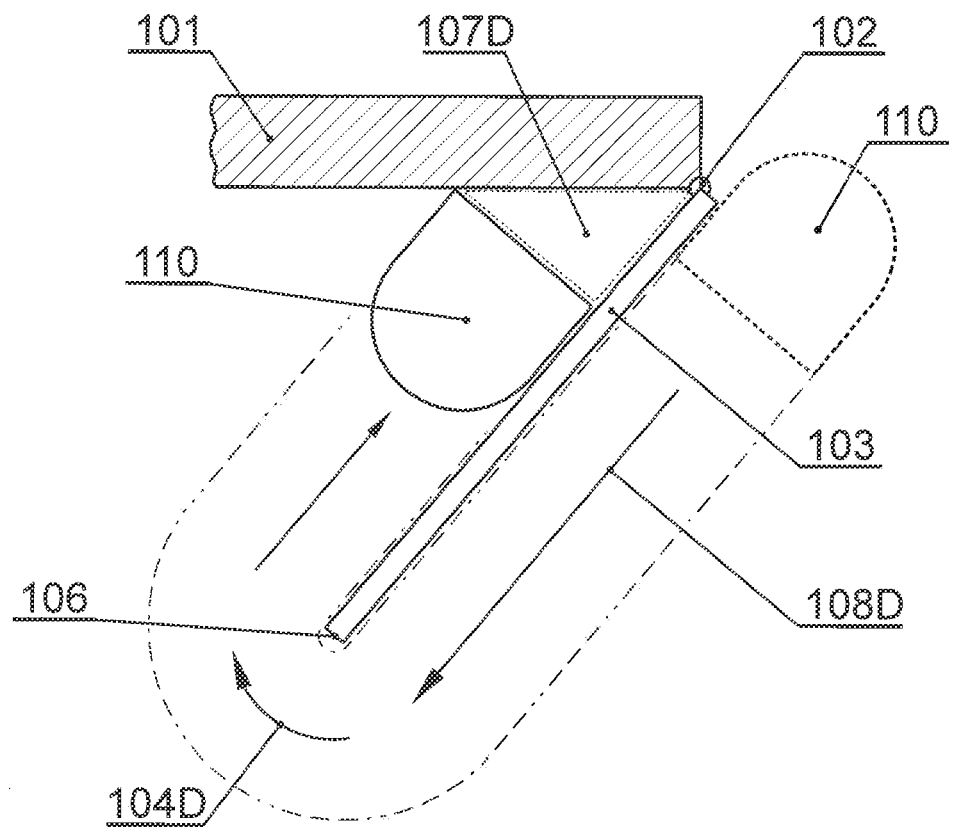
FIG. 11 presents a situation of an unreachable area.

This may be achieved by analysis of the parameters analogously to step (217) of method (200). However, in this embodiment the method does not begin with detection of the less than 90 degree angle but rather the detection of this angle finalises the determination that object (103) is a door. All markings in FIG. 11 are made according to previously described FIG. 1.

Figure 12:
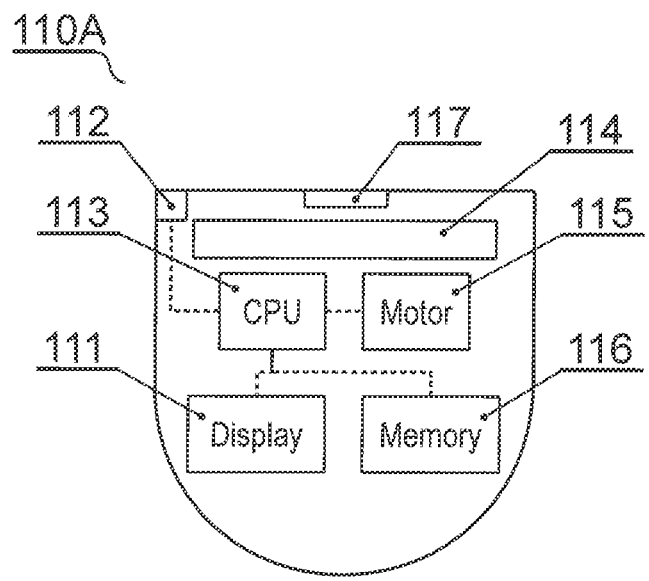
FIG. 12 shows an embodiment of the device comprising a hook manipulator.

In another aspect of the present invention, the robotic device (110) can be extended with a hook manipulator preferably placed near the front of the device (110A) as presented in FIG. 12. The device (110A) in FIG. 12 is marked according to marking in FIG. 10.

The hook manipulator (117) can be an electromagnet or a suction element or a neodymium magnet or any retractable form thereof or the like. This hook manipulator has a corresponding hook element that can be attached to objects like doors. The hook manipulator can be used by the device (110A) to attach to a hook in order to push or pull objects like doors. Thus it may be defined, that the robot (110) of this example comprises a different door wing position changing means, being in this case a hook element or a suction element.

A hook corresponding to an electromagnet hook manipulator or a neodymium hook manipulator may be a metal slate, while a hook corresponding to a suction hook manipulator may be a flat sticker or may be omitted entirely enabling hooking directly to the surface of the object.

Figure 13:
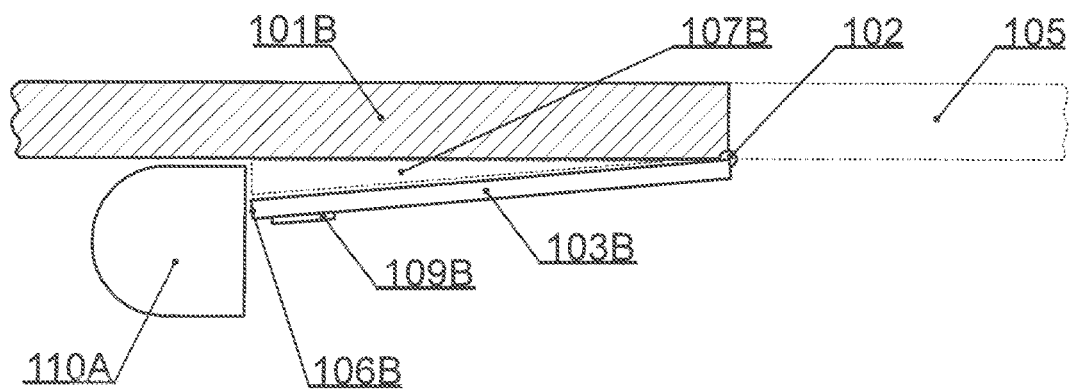
FIG. 13 presents another situation of an unreachable area.
Figure 14:
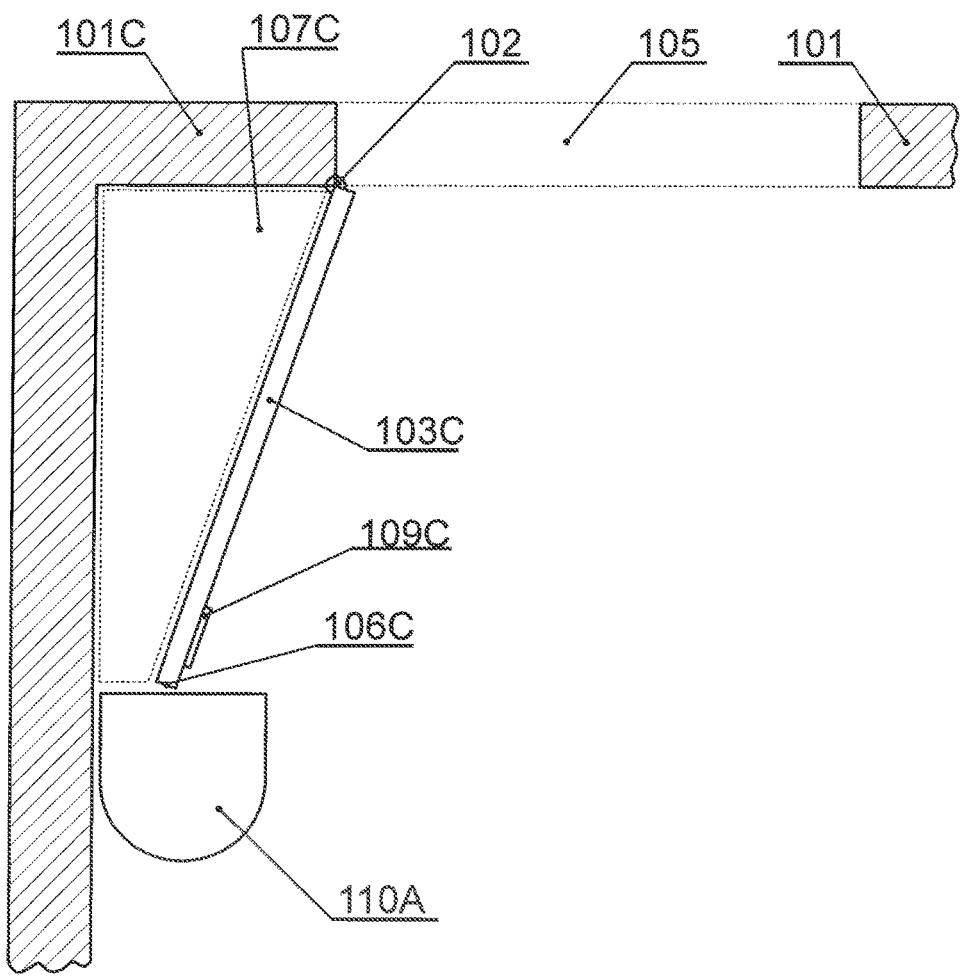
FIG. 14 presents a further situation of an unreachable area.

The purpose of the modification according to FIG. 12 are to allow the device (110A) to handle situations presented in FIG. 13 and FIG. 14 where it is not possible to push the door (103B) and (103C). Further, the hook manipulator (117) increases the precision of door movement in comparison to the push method.

In a further aspect of the present invention, the object (103B) and (103C) may further be equipped with a tag. The device (110A) is equipped with a sensor that is able to detect a tag when traveling along an obstacle e.g. a wall or door. The sensor may be placed as depicted by item (112) and may be the same sensor or a separate sensor or placed anywhere else on the device (110A). The tag may be an RFID tag or an optical tag (mirror or image) or a magnetic tag or the like.

Preferably, the tag has an enabled state and a disabled state wherein the enabled state allows the tag to be detected by the sensor and the disabled state disallows the tag from being detected by the sensor. The tag can be affixed to an obstacle, preferably a door, in a way allowing for the aforementioned detection, preferably when the tag is in an enabled state and disallowing the aforementioned detection preferably when the tag is in a disabled state.

The device (110A) may determine with the utmost certainty that the object (103B) and (103C) is a door if the aforementioned tag is detected. Then the method (200) or a modified method (200) may be stopped and adequate behavior may be enacted. It is apparent to a one skilled in the art that a similar method may be applied to the situation according to FIG. 1. Also the tag may be a separate object or device than the hook or can be merged into one or (in some embodiments) can be the same object or device or the like.

Exemplary embodiment of the method of using the hook manipulator and a hook are presented in FIG. 13 and FIG. 14. The hooks (109B) and (109C) may be attached to doors (103B) or (103C) respectively, preferably near the ends (106B) and (106C) respectively.

The device (110A) is able to detect the situations presented in FIG. 13 and FIG. 14 and recognize areas (107B) and (107C) as less than 90 degree angles. The angles' measure may in fact be greater than 90 degrees. It is however beneficial to keeping the unity of the method (200) to understand the corners at areas (107B) and (107C) as less than 90 degree corners in any case.

Figure 15:
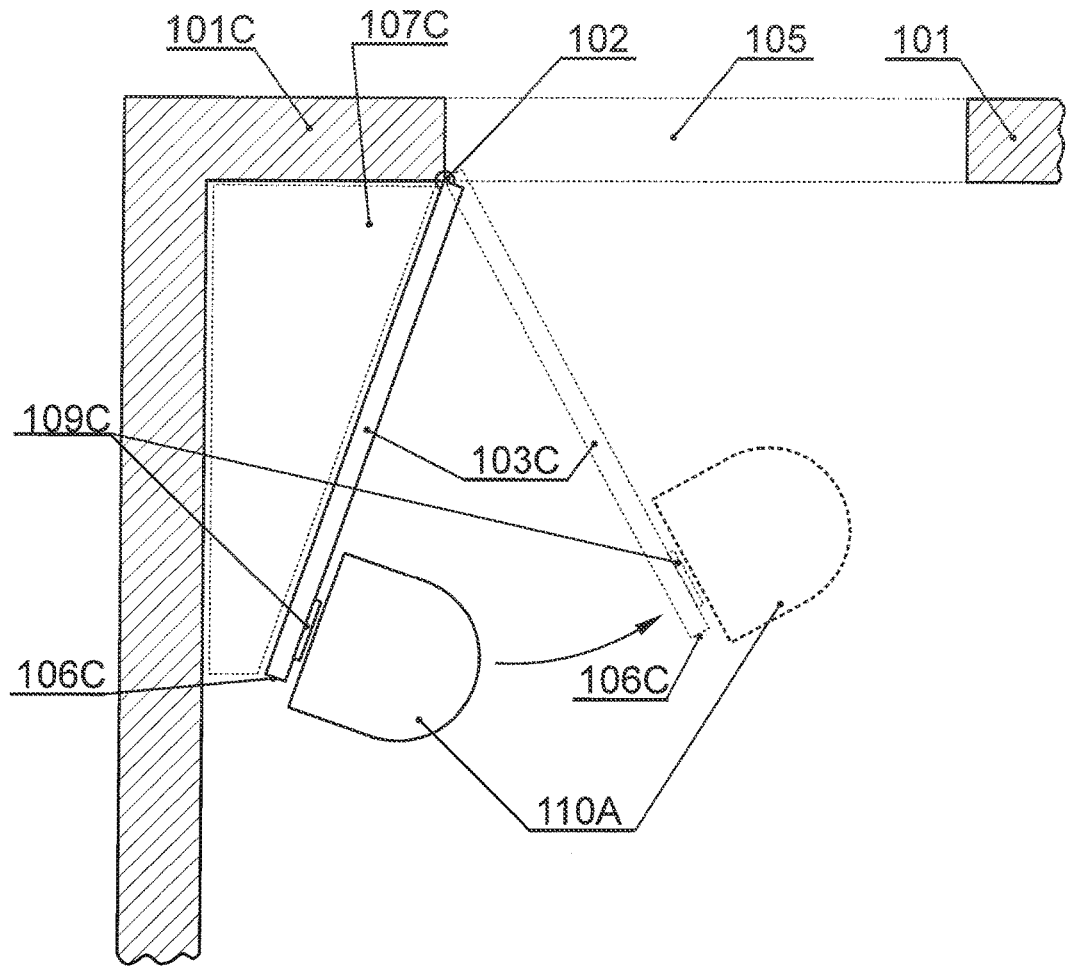
FIG. 15 depicts an exemplary use of the hook manipulator.

An exemplary use of the hook manipulator (117) and a hook (109C) or (109B) is presented in FIG. 15. The device (110A) positions itself so as to connect the hook manipulator (117) to the hook (109C) and pull the door to a desired position. The position understood as the point, at which the device (110A) stops pulling the door (103C), may be determined in any of the ways described in the previous embodiments.

Similarly to the previously described embodiments, also according to the present invention another embodiment may comprise the robot first remember the initial positioning of the door, then move the door as required to achieve best cleaning of the surface and lastly bring back the door to the initial position.

Figure 16:
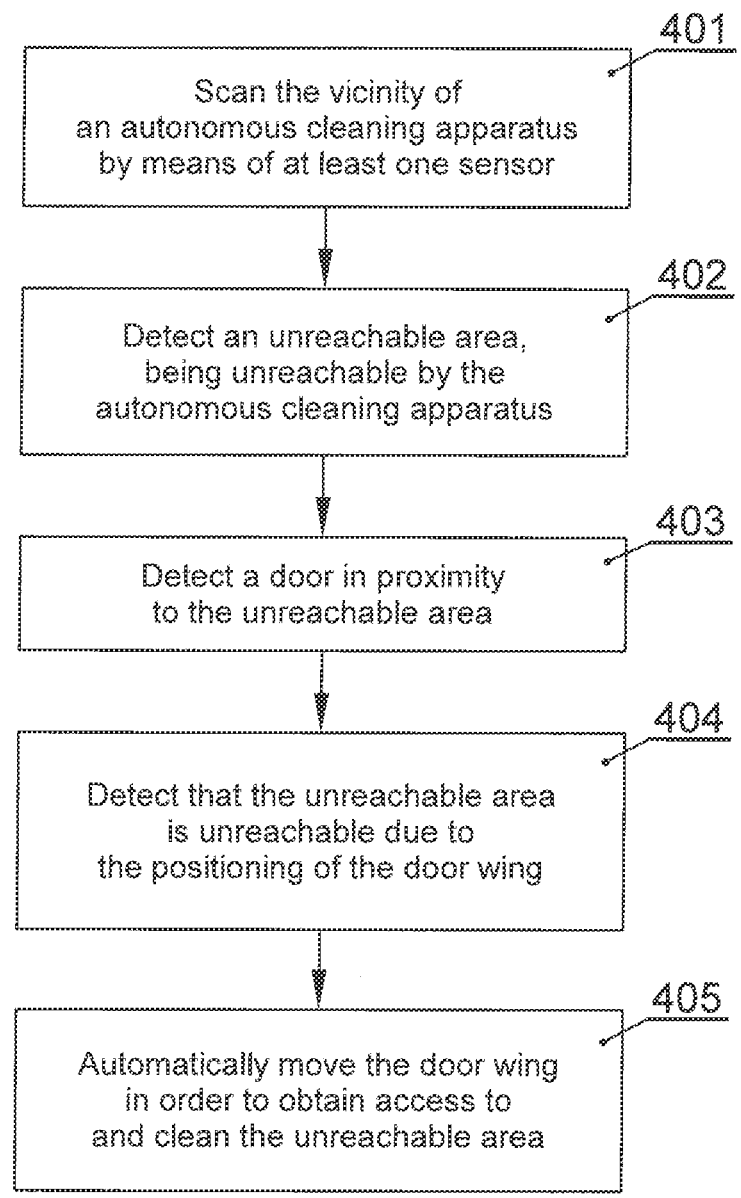
FIG. 16 presents the method according to the present invention.

FIG. 16 presents a general overview of the present method encompassing all of the aforementioned embodiments. At step (401), there is executed scanning of the vicinity of an autonomous cleaning apparatus by means of at least one sensor. Next (402), the system detects an unreachable area, being unreachable by the autonomous cleaning apparatus. Subsequently (403) the system detects a door in proximity to the unreachable area and establishes that the unreachable area is unreachable due to the positioning of the door wing. Next (404) the device (110) automatically moves the door wing in order to obtain access to and clean the unreachable area.

From the foregoing descriptions of the various embodiments of the present invention it can be appreciated that even though the invention does not guarantee the detection of every possible unreachable area by the autonomous cleaning apparatus, the methods according to the present invention allow to substantially increase the accuracy of surface coverage in at least the presented situations.

The aforementioned invention allows for more efficient cleaning by autonomous, robotic cleaners. Therefore, the invention provides a useful, concrete and tangible result.

According to the claimed method, a tangible device operates to a novel set of instructions, which improve its effectiveness. Thus, the machine or transformation test is fulfilled and the idea is not abstract.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for an autonomous cleaning apparatus may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according to the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. Method for an autonomous cleaning apparatus, the method comprising the steps of:
   scanning (401) a vicinity of an autonomous cleaning apparatus by means of at least one sensor;
   the method being characterized in that it further comprises the steps of:
   detecting an unreachable area (402), being unreachable by the autonomous cleaning apparatus;
   detecting a door (403) in proximity to the unreachable area (107);
   determining a thickness of the detected door (403);
   detecting (404) that the unreachable area is unreachable due to the positioning of the door wing;
   automatically moving (405) the door wing, by the autonomous cleaning apparatus, in order to obtain access to and clean the unreachable area.

2. The method according to claim 1 characterized in that the unreachable area (107) is a corner of 90 or less degrees measure.

3. The method according to claim 1 characterized in that the step of detecting a door (403) in proximity to the unreachable area (107) comprises measuring a length (D1, D2, 217) of either side of the door wing.

4. The method according to claim 3 characterized in that it further comprises determining presence of a door gap under the detected door.

5. The method according to claim 1 characterized in that the step of automatically moving (405) the door wing is effected by a door wing position changing means.

6. The method according to claim 5 characterized in that the door wing position changing means allow to push or pull the door wing.

7. The method according to claim 6 characterized in that the door wing position changing means is an electromagnet or a suction element or a neodymium magnet or a retractable hook.

8. The method according to claim 1 characterized in that the step of detecting a door (403) in proximity to the unreachable area (107) comprises detecting, with the at least one sensor, a tag attached to the door.

9. The method according to claim 8 characterized in that the tag is an RFID tag or an optical tag or a magnetic tag.

10. The method according to claim 9 characterized in that the tag has an enabled state and a disabled state wherein the enabled state allows the tag to be detected by the at least one sensor and the disabled state disallows the tag from being detected by the at least one sensor.

11. The method according to claim 1 characterized in that it further comprises the steps of remembering the initial positioning of the door; moving the door as required to achieve best cleaning of the surface and lastly bringing back the door to the initial position.

12. A non-transitory computer readable medium storing computer-executable instructions performing all the steps of the computer-implemented method according to claim 1 when executed on a computer.

13. System for an autonomous cleaning apparatus the system being characterized in that it comprises a controller configured to execute all steps of the method according to claim 1; and a door wing position changing means.

* * * * *